United States Patent [19]

Reiff et al.

[11] Patent Number: 5,025,064

[45] Date of Patent: Jun. 18, 1991

[54] PROCESS FOR THE PRODUCTION OF AQUEOUS POLYURETHANE DISPERSIONS

[75] Inventors: Helmut Reiff, Leverkusen; Otto Lorenz, Roetgen, both of Fed. Rep. of Germany

[73] Assignee: Bayer Aktiengesellschaft, Leverkusen, Fed. Rep. of Germany

[21] Appl. No.: 547,273

[22] Filed: Jul. 3, 1990

[30] Foreign Application Priority Data

Jul. 8, 1989 [DE] Fed. Rep. of Germany ....... 3922493

[51] Int. Cl.$^5$ .............................................. C08L 75/04
[52] U.S. Cl. .................................... 524/591; 524/839; 524/840
[58] Field of Search .................. 524/591, 839, 840

[56] References Cited

U.S. PATENT DOCUMENTS

| | | | |
|---|---|---|---|
| 3,479,310 | 11/1969 | Dieterich et al. | 260/29.2 |
| 4,092,286 | 5/1978 | Noll et al. | 250/29.2 |
| 4,237,264 | 12/1980 | Noll et al. | 528/67 |
| 4,408,008 | 10/1983 | Markusch | 524/591 |
| 4,764,553 | 8/1988 | Mosbach et al. | 524/591 |

FOREIGN PATENT DOCUMENTS 1076688 7/1967 United Kingdom .

*Primary Examiner*—Maurice J. Welsh
*Attorney, Agent, or Firm*—Joseph C. Gil; Thomas W. Roy

[57] ABSTRACT

The present invention relates to a process for the production of aqueous dispersions of polyurethanes containing chemically incorporated carboxylate groups wherein the counterions to the carboxylate groups are predominantly ammonium ions corresponding to the formula $$\overset{\oplus}{N}H_4 \quad \text{(II)}$$

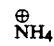

by mixing a starting aqueous dispersion of polyurethanes containing chemically incorporated carboxylate groups wherein the counterions to the carboxylate groups are ammonium ions corresponding to the formula $$R_1 - \overset{R_2}{\underset{H}{\overset{|}{N^\oplus}}} - R_3 \quad \text{(III)}$$

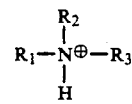

wherein $R_1$, $R_2$ and $R_3$ are the same or different and represent $C_{1-4}$ alkyl groups, provided that the total number of carbon atoms in these substituents is 3 to 6, with at least an equivalent quantity of ammonia, based on the trialkyl ammonium ions, and subsequently removing under vacuum at least a portion of the displaced trialkyl amines and the excess ammonia, if present.

10 Claims, No Drawings

PROCESS FOR THE PRODUCTION OF AQUEOUS POLYURETHANE DISPERSIONS

BACKGROUND OF THE INVENTION

1. Field of the Invention

This invention relates to a new process for the production of aqueous dispersions of polyurethanes containing chemically incorporated carboxylate groups wherein the counterions to the carboxylate groups are predominantly unsubstituted ammonium groups.

2. Description of the Prior Art

Aqueous dispersions of polyurethanes containing chemically incorporated carboxylate groups as hydrophilic centers are known (cf. for example DE-AS 1 495 745 (U.S. Pat. No. 3,479,310), GB-PS 1,076,688, U.S. Pat. No. 4,092,286, U.S. Pat No. 4,237,264 or U.S. Pat. No. 4,408,008).

In these known dispersions, ammonium cations derived from tertiary amines are generally present as counterions to the chemically incorporated carboxylate groups. For example, it is expressly recommended in U.S. Pat. No. 4,408,008 (column 9, line 46 to column 10, line 1) to use amines with no isocyanate-reactive hydrogen atoms to neutralize the carboxyl groups in the production of aqueous polyurethane dispersions. The advantage of using readily volatile tertiary amines to neutralize the chemically incorporated carboxyl groups is that the amines diffuse off during the production of coatings from the polyurethane dispersions which increases the resistance of the coatings to water vapor. The disadvantage of readily volatile tertiary amines is that they are neither ecologically nor toxicologically desirable.

Accordingly, a considerable advance is embodied in the dispersions of polyurethanes containing carboxylate groups described in EP-A-0 269 972 which contain ionic hydrophilic centers corresponding to the formula

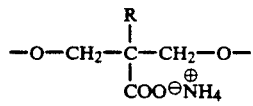

wherein R is a $C_{1-4}$ alkyl radical.

In contrast to Example 11 of DE-AS 1 495 745, which describes the production of a dispersion containing ammonium groups as counterions which is unsatisfactory for many applications, the dispersions according to EP-A-0 269 972 are high quality products whose only disadvantage is the disclosed process for their production. Thus, in the production of the polyurethanes, only very special hydroxycarboxylic acids can be used to incorporate the ionic centers such as dimethylol propionic acid. The hydroxyl groups of these special hydroxycarboxylic acids react selectively with isocyanates to form urethanes without the carboxyl groups participating in the reaction so that, after production of the polyurethanes, they can be converted into carboxylate groups by neutralization. In addition, in the production of the polyurethanes, the isocyanate polyaddition reaction has to be complete before the carboxyl groups are neutralized with ammonia to avoid any reaction between the isocyanate groups and ammonia. For the same reason, polyhydroxycarboxylic acids cannot be used in salt form as ionic synthesis component.

A particularly simple process has now been found for the production of aqueous dispersions of polyurethanes containing incorporated carboxylate groups in which ammonium groups

are present as counter-ions.

The process according to the invention, which is described in detail hereinafter, is based on the surprising observation that, despite their comparatively high boiling point, the tertiary amine counterions present in the starting dispersions can be replaced with unsubstituted ammonium groups by treatment of the aqueous dispersions with ammonia and subsequent removal of the excess base by distillation under vacuum.

SUMMARY OF THE INVENTION

The present invention relates to a process for the production of aqueous dispersions of polyurethanes containing chemically incorporated carboxylate groups wherein the counterions to the carboxylate groups are predominantly ammonium ions corresponding to the formula

by mixing a starting aqueous dispersion of polyurethanes containing chemically incorporated carboxylate groups wherein the counterions to the carboxylate groups are ammonium ions corresponding to the formula

wherein $R_1$, $R_2$ and $R_3$ are the same or different and represent $C_{1-4}$ alkyl groups, provided that the total number of carbon atoms in these substituents is 3 to 6, with at least an equivalent quantity of ammonia, based on the trialkyl ammonium ions, and subsequently removing under vacuum at least a portion of the displaced trialkyl amines and the excess ammonia, if present.

DETAILED DESCRIPTION OF THE INVENTION

Any aqueous dispersions of polyurethanes containing incorporated carboxylate groups having ammonium counterions obtained by the addition of a proton to a tertiary aliphatic amine having 3 to 6 carbon atoms are suitable as starting dispersions for the process according to the invention. Accordingly, ammonium ions corresponding to formula III, wherein $R_1$, $R_2$ and $R_3$ represent alkyl groups as previously defined, preferably methyl or ethyl groups and more preferably ethyl groups, are present as counterions to the chemically incorporated carboxylate groups in the dispersions used as starting materials.

The counterions for the carboxylate groups may be obtained by the addition of a proton onto an aliphatic amine such as trimethylamine, triethylamine, N-methyl-N-ethyl propylamine, N,N-dimethyl-ethylamine, N,N- diethyl-methylamine or N,N-dimethyl-n-butylamine, preferably trimethylamine or triethylamine and more preferably triethylamine.

Apart from this limitation on the type of counterion, the process according to the invention may be carried out using any of the aqueous polyurethane dispersions known from the prior art. Examples include the aqueous polyurethane dispersions containing carboxylate groups of the type mentioned as the only hydrophilic groups as described in U.S. Pat. No. 3,479,310 (herein incorporated by reference) or GB-PS 1,076,688, and also those which, in addition to anionic groups, contain ethylene oxide units present in terminal or lateral polyether chains as further hydrophilic groups. These aqueous polyurethane dispersions may be obtained, for example, in accordance with U.S. Pat. No. 4,092,286, U.S. Pat. No. 4,190,566, U.S. Pat. No. 4,237,264, U.S. Pat. No. 4,192,937, U.S. Pat. No. 4,269,748 or U.S. Pat. No. 4,408,008 (all of the preceding U.S. patents, herein incorporated by reference) or DE-OS 2 725 589 (U.S. Pat. No. 4,829,122, herein incorporated by reference).

The aqueous polyurethane dispersions to be used in the according to the invention generally contain 0.1 to 120, preferably 2 to 100 milliequivalents of carboxylate groups chemically incorporated into the polyurethane per 100 g of solids, and 0 to 30, preferably 0.5 to 10% by weight of ethylene oxide units present in terminal or lateral polyether chains, provided that the total content of hydrophilic groups is sufficient to ensure the dispersibility of the polyurethanes in water. The counterions to the carboxylate groups are the ammonium ions corresponding to formula III.

Aqueous dispersions of polyurethanes containing carboxylate groups, in which the ionic groups are contained in structural units corresponding to the formula IV

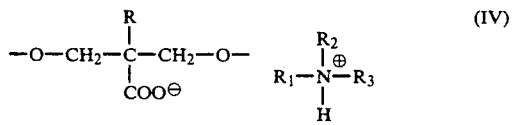

wherein

R represents a $C_{1-4}$ alkyl radical, preferably a methyl radical and $R_1$ to $R_3$ represent the previously defined groups, are particularly preferred for the process according to the invention. These particularly preferred aqueous polyurethane dispersions may be prepared according to the previously described prior art processes using dimethylolalkane carboxylic acids corresponding to the formula

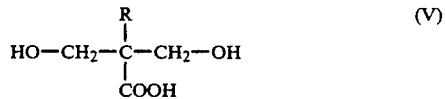

wherein R is a $C_{1-4}$ alkyl group, for the production of the polyurethanes with subsequent neutralization of the carboxyl groups with tertiary aliphatic amines containing 3 to 6 carbon atoms or by using the corresponding salts as an ionic synthesis component in the production of the polyurethanes.

To carry out the process according to the invention, the aqueous dispersions generally have a solids content of 5 to 50% by weight. The continuous phase of the dispersions used in the process according to the invention is based on water or a mixture of water with an organic solvent optionally used in the production of the dispersions such as acetone or N-methyl pyrrolidone. These solvents may optionally be present in the aqueous dispersions in a quantity of up to 35% by weight, based on the weight of the continuous liquid phase. When the dispersions are produced using these organic solvents, the solvents are generally removed by distillation after production of the dispersions. In accordance with the present invention the removal of the organic solvent by distillation may be carried out together with the process according to the invention which also requires a distillation step.

To carry out the process according to the invention, ammonia is added to the starting dispersions in an amount sufficient to provide at least 1 mole, preferably 2 to 15 moles and more preferably 3 to 8 moles of ammonia for every mole of counterions corresponding to formula III present in the dispersions. The ammonia may be introduced into the dispersion in gaseous form. However, the ammonia is preferably used in the form of a 1 to 25% by weight, preferably 5 to 15% by weight aqueous solution at a temperature from room temperature to 80° C.

After the ammonia has been added, the dispersion is generally stirred for 15 minutes to 18 hours, followed by removal of the excess base by distillation under vacuum at a temperature of 10° to 60° C. The trialkylamine which is removed by distillation may be recycled for the preparation of another batch. If desired, the water optionally distilled off at the same time is at least partly replaced by the addition of more water to establish the desired solids content in the ready-to-use dispersion. In embodiments where the aqueous dispersions also contain low boiling organic solvents, these solvents may also be substantially removed by distillation at the same time as the removal of the excess base by distillation.

In accordance with the present invention it is possible in a single step to obtain aqueous dispersions of polyurethanes containing incorporated carboxylate groups, wherein at least 50 equivalent-% and preferably at least 75 equivalent-% of the counterions consist of ammonium ions corresponding to formula II. If desired, the described process may be repeated as often as necessary to complete the cation exchange.

It must be regarded as particularly surprising that it is possible by this simple method to substantially replace the trialkylamines with ammonia because the trialkylamines are relatively strong bases and, in addition, have distinctly higher boiling points than ammonia.

The products obtained in accordance with the process of the present invention are valuable coating compositions for any substrates. Ammonia escapes during drying of the coatings.

In the following examples, all percentages are percentages by weight.

EXAMPLES

Preparation of an aqueous polyurethane dispersion I

Starting materials

| | |
|---|---|
| 200 g | polypropylene glycol, molecular weight 2,000 |
| 10.4 g | dimethylol propionic acid |
| 7.1 g | of a monohydric polyether alcohol having an OH number of 26 and prepared by the alkoxylation of n-butanol using a mixture of 83% ethylene oxide and 17% propylene oxide |

| | |
|---|---|
| 87.3 g | 1-isocyanato-3,3,5-trimethyl-5-isocyanatomethyl cyclohexane (IPDI) |
| 48.1 g | caprolactam |
| 7.9 g | triethylamine |
| 830 g | deionized water |

Procedure

Dimethylene propionic acid and the dehydrated polyethers were initially introduced and reacted with IPDI at 80° to 105° C. After 90 minutes, caprolactam was added, followed by stirring for another 60 minutes at 105° C. The triethylamine was added dropwise at 100° C., followed by stirring for 3 to 5 hours at 100° C. until no more isocyanate could be detected by infrared analysis. The reaction product was then dispersed in water over a period of 8 minutes and the resulting dispersion was cooled to room temperature. Approximately 1200 g of a finely divided, storage stable polyurethane dispersion were obtained.

The polyurethane dispersion had carboxylate group content of 21.4 milliequivalents (meq) per 100 g solids, a content of ethylene oxide units of 1.6%, a pH value of 8 and a solids content of 30% (calculated).

Preparation of an aoueous polyurethane dispersion II 38.8 g (0.231 moles) of 1, 6-diisocyanatohexane were added at 50° C. to a dehydrated mixture of 248 g (0.146 moles) of a hexanediol/neopentyl glycol adipate (molar ratio of glycols 1:1) and 12.5 g of an n-butanol-initiated polyethylene oxide/polypropylene oxide polyether (EO:PO ratio 85:15) having a molecular weight 2300. After heating for 2 hours to 105° C., the NCO-terminated prepolymer was dissolved in 770 ml acetone. The NCO content was 1.85% by weight.

The solution was then stirred with 37.4 g (0.064 moles) of a 40% aqueous solution of the triethylamine salt of N-aminoethyl-B-aminopropionic acid in 50 ml water. After 15 minutes, the product was dispersed with 640 ml water and the acetone was distilled off resulting in a very finely divided, stable polyurethane dispersion containing triethyl ammonium carboxylate groups.

| Data: | quantity: | 1000 g |
|---|---|---|
| | pH value: | 6-7 |
| | solids content: | 30% |
| | COO$^\ominus$ content: | 20.4 meq/100 g solids |

Preparation of an aqueous polyurethane dispersion III

The preparation of polyurethane dispersion II was repeated with the exception that only 26.9 g (0.046 moles) of the triethylamine salt of N-aminoethyl-B-aminopropionic acid was used. The resulting polyurethane dispersion was very similar to polyurethane dispersion II, but contained only 14.9 meq of carboxylate groups per 100 g of solids.

EXAMPLE 1 (process according to the invention)

32.6 g (115 meq) of a 6% aqueous ammonia solution were added to 500 g of polyurethane dispersion I which contained 32.1 meq of triethylamine in protonated form. After stirring for 30 minutes at room temperature, a mixture of water, triethylamine and ammonia was distilled off under vacuum at room temperature and condensed in a cold trap. 140 g of condensate containing 22 meq of triethylamine were obtained which corresponded to an exchange rate of 67.5 equivalent %.

The dispersion was readjusted to a solids content of 30% by the addition of 140 g water. It had a pH value of 8.3±0.2 and remained stable in storage for months with no change in the particle size.

EXAMPLE 2 (process according to the invention)

Example 1 was repeated using three times the quantity of the 6% aqueous ammonia solution (345 meq). The condensate (155 g) contained 28.4 meq of triethylamine which corresponded to an exchange rate of at least 88.5 equivalent %.

EXAMPLE 3 (process according to the invention)

500 g of polyurethane dispersion II were mixed with 22.7 g of a 25% aqueous ammonia solution (15-fold excess, based on triethylamine). The mixture was stirred at room temperature for 2 hours and distilled under vacuum. 170 ml of distillate containing water, ammonia and triethylamine were obtained in a receiver cooled with dry ice. The triethylamine content was quantitatively analyzed and corresponded to a quantity of 86% of the theoretical. When this example was repeated using polyurethane dispersion III, a quantity of 81% of the theoretical amount of triethylamine was obtained in the distillate.

EXAMPLE 4 (preparation of an aqueous polyurethane dispersion and process according to the invention)

A dispersion was prepared in accordance with the acetone process described in U.S. Pat. No. 3,479,310 by forming the reaction product of

| | |
|---|---|
| 0.16 moles | of a polyester polyol, molecular weight 1740, of (i) equimolar quantities of adipic acid and phthalic acid and (ii) ethylene glycol, |
| 0.05 moles | dihydroxypolycaprolactone, molecular weight 2000, |
| 0.5 moles | 2,2-bis-(4-hydroxycyclohexyl)-propane (BHP), |
| 0.4 moles | hexamethylene diisocyanate (HDI) |
| 0.6 moles | 3-isocyanatomethyl-3,5,5-trimethyl cyclohexyl isocyanate (IPDI) and |
| 0.25 moles | triethyl ammonium salt of dimethylol propionic acid, | in the presence of 1945 ml acetone and dispersing the dissolved reaction product in 1140 g of water.

The dispersed polyurethane had a carboxylate group content of 33.3 meq per 100 g of solids. The particle diameter which was determined from turbidity measurements, was <20 nm.

The acetone dispersion was stirred overnight at room temperature. It was then divided into four equal parts to which 6% aqueous ammonia was added in the amount set forth in the following Table.

After stirring for 30 minutes at room temperature, a mixture of acetone, water, ammonia and triethylamine was distilled off under vacuum using cold traps. The triethylamine present in the distillate from the displacement reaction was quantitatively analyzed. The triethylamine/ammonia exchange rate was calculated from the quantities found.

The solids content of dispersions 4(a) to 4(d) was adjusted to 30% by the addition of water. Finely divided, stable, aqueous polyurethane dispersions were obtained in which the cationic counterions to the chemically incorporated carboxylate groups were predominantly unsubstituted ammonium ions, as shown in the following Table.

TABLE

| Molar Ratio of $NH_3$ to $N(Et)_3$ | Mol-% of $-COO^{(-)}N^{(+)}H_4$ based on total amount of carboxylate group |
|---|---|
| (4a) 2 | 54 |
| (4b) 5 | 76 |
| (4c) 10 | 81 |
| (4d) 20 | 92 |

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. A process for the production of an aqueous dispersion of polyurethanes containing chemically incorporated carboxylate groups wherein the counterions to the carboxylate groups are predominantly ammonium ions corresponding to the formula $$\overset{\oplus}{NH_4}$$

which comprises mixing a starting aqueous dispersion of polyurethanes containing chemically incorporated carboxylate groups wherein the counterions to the carboxylate groups comprise ammonium ions corresponding to the formula

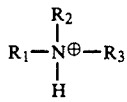

wherein
$R_1$, $R_2$ and $R_3$ are the same or different and represent $C_{1-4}$ alkyl groups, provided that the total number of carbon atoms in these substituents is 3 to 6, with at least an equivalent quantity of ammonia, based on the trialkyl ammonium ions, and subsequently removing under vacuum at least a portion of the displaced trialkyl amines and the excess ammonia, if present.

2. The process of claim 1 wherein said starting aqueous dispersion contains anionically modified polyurethanes having 0.1 to 120 milliequivalents per 100 g of solids of carboxylate groups in the form of incorporated structural units corresponding to the formula

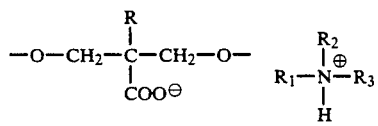

wherein
R is a $C_{1-4}$ alkyl radical.

3. The process of claim 1 wherein ammonia is used in the form of an aqueous ammonia solution.

4. The process of claim 2 wherein ammonia is used in the form of an aqueous ammonia solution.

5. The process of claim 1 wherein said polyurethanes contain a positive amount of up to 30% by weight of ethylene oxide units present in terminal or lateral polyether chains.

6. The process of claim 4 wherein said polyurethanes contain a positive amount of up to 30% by weight of ethylene oxide units present in terminal or lateral polyether chains.

7. The process of claim 1 wherein $R_1$, $R_2$ and $R_3$ represent ethyl groups.

8. The process of claim 2 wherein $R_1$, $R_2$ and $R_3$ represent ethyl groups.

9. The process of claim 4 wherein $R_1$, $R_2$ and $R_3$ represent ethyl groups.

10. The process of claim 6 wherein $R_1$, $R_2$ and $R_3$ represent ethyl groups.

* * * * *